US012456801B1

(12) United States Patent
Burley

(10) Patent No.: US 12,456,801 B1
(45) Date of Patent: Oct. 28, 2025

(54) CONTAINER FOR SHIPPING A SATELLITE TERMINAL

(71) Applicant: Airbus DS Government Solutions, Inc., Plano, TX (US)

(72) Inventor: Elijah Burley, Plano, TX (US)

(73) Assignee: Airbus DS Government Solutions, Inc., Plano, TX (US)

( * ) Notice: Subject to any disclaimer, the term of this patent is extended or adjusted under 35 U.S.C. 154(b) by 687 days.

(21) Appl. No.: 17/003,943

(22) Filed: Aug. 26, 2020

Related U.S. Application Data

(60) Provisional application No. 62/893,003, filed on Aug. 28, 2019.

(51) Int. Cl.

| | |
|---|---|
| ***H01Q 1/10*** | (2006.01) |
| ***B64G 5/00*** | (2006.01) |
| ***B65D 90/00*** | (2006.01) |
| ***H01Q 1/00*** | (2006.01) |
| ***H01Q 1/12*** | (2006.01) |
| ***H01Q 1/44*** | (2006.01) |
| ***H01Q 3/16*** | (2006.01) |

(52) U.S. Cl.

CPC ................. *H01Q 1/44* (2013.01); *B64G 5/00* (2013.01); *B65D 90/0073* (2013.01); *H01Q 1/002* (2013.01); *H01Q 1/103* (2013.01); *H01Q 1/12* (2013.01); *H01Q 3/16* (2013.01)

(58) Field of Classification Search

CPC ...... B65D 21/02; B65D 19/44; B65D 90/006; B65B 39/00; B65B 3/06; Y02W 30/80

USPC ...................................... 220/521, 23.83, 1.5

See application file for complete search history.

(56) References Cited

U.S. PATENT DOCUMENTS

| | | | | |
|---|---|---|---|---|
| 1,908,418 A | | 5/1933 | Guthrie | |
| 2,566,186 A | | 8/1951 | Gillett et al. | |
| 3,148,776 A | | 9/1964 | Cook et al. | |
| 4,482,066 A | * | 11/1984 | Dykstra | A47B 88/493 211/151 |
| 5,119,947 A | | 6/1992 | Stewart | |
| 5,268,149 A | | 12/1993 | Arafat | |
| 5,957,558 A | | 9/1999 | Quade | |
| 8,368,606 B1 | * | 2/2013 | Haugan | H01Q 1/3216 343/912 |
| 8,558,753 B2 | | 10/2013 | Haight | |

(Continued)

FOREIGN PATENT DOCUMENTS

| | | | | |
|---|---|---|---|---|
| CN | 207382469 | | 5/2018 | |
| WO | WO-0123261 A1 | * | 4/2001 | B65D 88/121 |

OTHER PUBLICATIONS

Web Article: Harris assured communications, Modular Aperture Quad-Band Antenna Terminal (MAQA Terminal), 2 pages, May 29, 2019 https://www.harris.com/solution/modular-aperture-quad-band-antenna-maqa.

*Primary Examiner* — Anthony D Stashick
*Assistant Examiner* — Raven Collins
(74) *Attorney, Agent, or Firm* — Fox Rothschild LLP

(57) ABSTRACT

A container for shipping a satellite terminal includes one or more compartments that are configured to partition an internal space of the container and securely receive one or more parts of the satellite terminal. The container further includes one or more devices that are configured to secure the parts and prevent them from being moved or damaged. The container, the compartments and the devices are of high-strength materials that bear a weight of the parts and external shocks.

5 Claims, 18 Drawing Sheets

(56) References Cited

U.S. PATENT DOCUMENTS

| | | | | |
|---|---|---|---|---|
| 8,654,035 | B2 | 2/2014 | Proffitt et al. | |
| 8,763,820 | B2 | 7/2014 | Hanley | |
| 8,770,422 | B2 * | 7/2014 | Cantin | E04H 15/34 206/595 |
| 8,882,441 | B2 * | 11/2014 | Harrison | E04H 12/182 415/4.4 |
| 8,919,894 | B1 | 12/2014 | Pachmayr | |
| 9,212,499 | B1 * | 12/2015 | Maurer | E04H 5/02 |
| 9,350,083 | B2 | 5/2016 | Zimmerman et al. | |
| 10,240,339 | B1 | 3/2019 | Dominguez | |
| 2007/0241155 | A1 | 10/2007 | Trajkovic et al. | |
| 2010/0012607 | A1 | 1/2010 | Grainger | |
| 2013/0146552 | A1 | 6/2013 | Grimes | |
| 2014/0116870 | A1 * | 5/2014 | Kamen | E04H 3/02 202/83 |
| 2014/0158854 | A1 | 6/2014 | Conrad | |
| 2015/0104287 | A1 * | 4/2015 | Ryan | B65D 90/021 414/800 |
| 2017/0113863 | A1 * | 4/2017 | Cline | B65D 81/107 |
| 2019/0330917 | A1 * | 10/2019 | McElvany | F24F 13/20 |

* cited by examiner

CONTAINER FOR SHIPPING A SATELLITE TERMINAL

CROSS-REFERENCE TO RELATED APPLICATIONS

This application claims the benefit of U.S. Provisional Application 62/893,003, filed on Aug. 28 2019, the entirety of which is expressly incorporated herein by reference thereto.

FIELD OF THE INVENTION

The present invention generally relates to a container for shipping a satellite terminal includes one or more compartments that are configured to partition an internal space of the container and securely receive one or more parts of the satellite terminal. The container further includes one or more devices that are configured to secure the parts and prevent them from being moved or damaged. The container, the compartments and the devices are of high-strength materials that bear a weight of the parts and external shocks.

BACKGROUND OF THE INVENTION

One of the main components in a radio communications system is a satellite terminal. Many satellite terminals can be transported using a container. During the transportation, the container can be easily shaken or rolled, thereby damaging the terminals. In many military applications, satellite terminals stored in the container without proper attachment thereto are substantially prone to breakage. In particular, air drop of the container may lead to the complete breakage of satellite terminals stored therein.

In addition, some applications require the ability to quickly and easily transport a satellite terminal to a location that is the site of a temporary operation, which can be a rugged or remote location, for assembly of the satellite terminal (and disassembly and return transport) from the site. Such applications can involve military satellite terminals (or similar) involving heavy components used in the structure of the satellite terminal. Known technology for such application has disadvantages such as it can require the use of many shipping container or not being capable of air delivery. Embodiments of the present invention are directed to improved containers for transporting a satellite terminal and to improved components or features implemented in the container and can include other applications.

SUMMARY OF THE INVENTION

The claimed invention relates to a container for shipping a satellite terminal. The container comprises one or more compartments that are configured to partition an internal space of the container and securely receive one or more parts of the satellite terminal. The container further comprises one or more devices that are configured to secure the parts and prevent them from being moved or damaged. The container, the compartments and the devices are of high-strength materials that bear a weight of the parts and external shocks. The high-strength materials preferably comprise carbon fiber, aluminum, or a combination thereof.

In some embodiments, the satellite terminal comprises reflector parts, beams, pedestal parts, brackets, a generator, a modem, and an amplifier. A relatively heavy part of the satellite terminal is received in a lower part of the compartments to lower the center of gravity for stability. Preferably, some of the compartments are in the form of a bag capable of holding the parts. In some desirable embodiments, a variety of devices are placed and configured to receive a corresponding portion of satellite parts, thereby preventing satellite parts from being moved or damaged. The devices may comprise a latch, a wire, or a cable that is positioned to secure the bag. The devices may further comprise a rack that is drawable, hingable, or both such that the parts can be easily received. The devices may further comprise a strap that is tightly placed on a portion of the parts. The devices may further comprise a metal piece that is installed vertically, horizontally, or both across a side of the compartments. The devices may further comprise a rail or slot that slidably receives a portion of the parts. The devices may further comprise a holder that receives a portion of the parts corresponding to a shape of the holder.

In preferred embodiments, the container further comprises an outermost door that has access to the compartments. The door is preferably hinged.

The invention is also related to another container for shipping a satellite terminal. The container comprises one or more compartments that are configured to partition an internal space of the container and securely receive one or more parts of the satellite terminal. The container further comprises one or more devices that are configured to secure the parts and prevent them from being moved or damaged. The devices comprise a rack that is drawable, hingable, or both such that the parts can be easily received. The devices further comprise a strap that is tightly placed on a portion of the parts. The devices further comprise a metal piece that is installed vertically, horizontally, or both across a side of the compartments. The devices further comprise a rail or slot that slidably receives a portion of the parts. The devices further comprise a holder that receives a portion of the parts corresponding to a shape of the holder. The container further comprises an outermost door that has access to the compartments. The container, the compartments and the devices are of high-strength materials that bear a weight of the parts and external shocks. The high-strength materials preferably comprise carbon fiber, aluminum, or a combination thereof.

In some embodiments, the satellite terminal comprises reflector parts, beams, pedestal parts, brackets, a generator, a modem, and an amplifier. Preferably, some of the compartments are in the form of a bag capable of holding the parts. The container may further comprise a latch, a wire, or a cable that is vertically positioned to secure the bag. The door is preferably hinged. A relatively heavy part of the satellite terminal is received in a lower part of the compartments to lower the center of gravity for stability.

BRIEF DESCRIPTION OF THE DRAWINGS

These and other advantages of the present invention will become apparent from the subsequent detailed description of the invention and the appended claims taken in conjunction with the accompanying drawings, wherein:

DETAILED DESCRIPTION OF THE PREFERRED EMBODIMENTS

Figure 1:
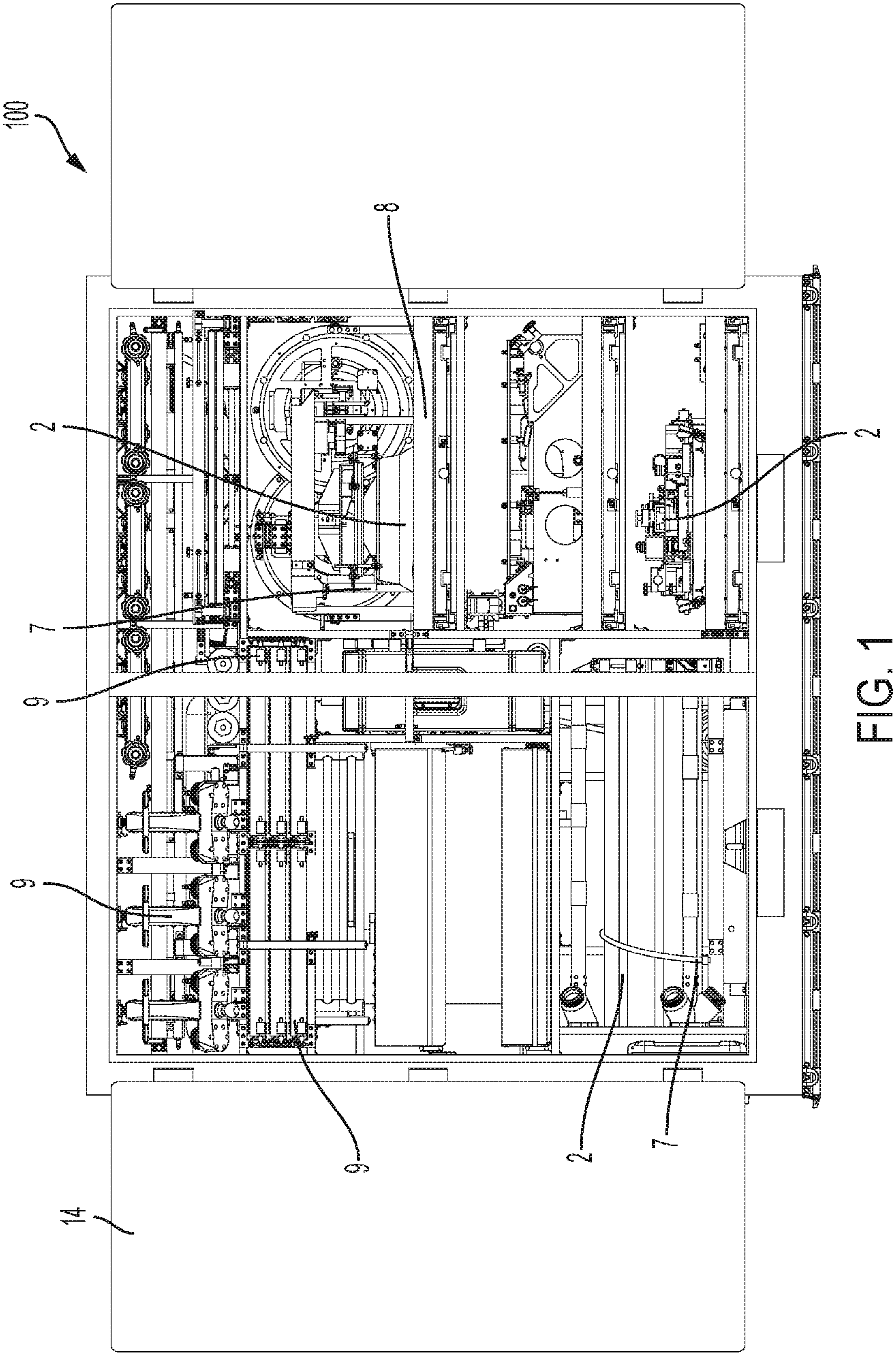
FIG. 1 is a front view of an embodiment of the container for shipping a satellite terminal.

Further in relation to this, before explaining at least the preferred embodiments of the invention in greater detail, it is to be understood that the invention is not limited in its application to the details of construction and to the arrangements of the components set forth in the following description, or illustrated in the appended Figures. it would be understood by those of ordinary skill in the art that embodiments beyond those described herein are contemplated, and the embodiments can be practiced and carried out in a plurality of different ways. Also it is to be understood that the terminology used herein is for the purpose of description and should not be regarded as a limiting factor.

As such, those having ordinary skill in the art will appreciate that the conception upon which this disclosure is based may also be utilized as a basis for designing other structures for carrying out the several purposes of the present invention. It is therefore equally important that the claims be regarded as including such equivalent constructions, insofar as they do not depart from the spirit and scope of the present invention.

the terms used herein refer to that which the ordinary artisan would understand such term to mean based on the contextual use of such term herein. To the extent that the meaning of a term used herein as understood by the ordinary artisan based on the contextual use of such term differs in any way from any particular dictionary definition of such term, it is intended that the meaning of the term as understood by the ordinary artisan will prevail.

In accordance with the principles of the present invention, container or a box for shipping a satellite terminal is provided, which can bear the weight of the satellite terminal and external shocks.

In many applications involving movable satellite terminals, it is important to be able to quickly and efficiently transport components that make up the satellite terminal in a secure and physically protected. The weight of such components and the satellite terminal in total can be significant. In addition, there can be many components involved in the structure of the terminal. It can be highly complex and difficult to configure a shipping container to fit and house the components of the satellite terminal, such as fitting it into a standard military shipping container. The present embodiments are configuration of storage containers with the shopping container were found to accomplish such objective but the solution was only found through significant effort, experimentation, and testing. The container is also adapted to have a structure that suited for ease of removing components from the container and also reloading the equipment by people who are in charge of installing the terminal. For example, equipment is configured to position heavier items in locations and configuration that can be removed more easily.

Now, generally referring to the drawings in which like numerals represent like components throughout the several views, FIGS. 1-4 depict the various embodiments of the present invention.

A container 100 for shipping a satellite terminal such as a component 2, as depicted in FIG. 1. To clarify, some of the satellite terminal components are not shown in FIG. 1. In some embodiments, the container is adapted to store every and all of the satellite terminal components and be movable to desired places by users or operators, which makes the components portable. Preferably, two users or operators can easily setup the terminal without the need of a heavy equipment such as a crane or forklift. The container 100 comprises one or more compartments 1 that are configured to partition an internal space of the container 100 and securely receive and fasten one or more parts of the satellite terminal. The container comprises an outermost door 14 that has access to the compartments. The door 14 is preferably hinged. The door 14 of the container 100 is currently open in FIG. 1. The one or more compartments 1 are partitioned from each other by, for example, frames that define internal structures of the container 100. Although the one or more compartments 1 are partitioned by frames, some or all of them are open to each other. Alternatively, the one or more compartments 1 can be partially or completely blocked from each other by frames. In an embodiment, the one or more compartments 1 are in the form of a container. The container 100 further comprises one or more devices that are configured to secure the parts and prevent them from being moved or damaged. The container 100, compartments 1, frames, and devices are of high-strength materials that adapt container 100 to bear a weight of the parts and impact of external physical shock to container 100. The high-strength materials may include, but not be limited to, carbon fiber, aluminum, or a combination thereof. An alternative high-strength materials known to a person skilled in the art can be used. This is especially important because in some embodiments, the container 100 is a military grade airdrop feasible container whose outside and inside structures are solid enough to withstand weight of the parts and external shock. The container 100 can also be exposed to harsh environments such as hot, cold, wet, dry, and/or caustic conditions in military settings. It is desirable that most, if not all, of the materials for each structure or substructure of the container 100 are strong and durable to be qualified for required uses and purposes.

In some embodiments, the satellite terminal 2 comprises reflector parts, beams, pedestal parts, brackets, a generator, a modem, and an amplifier. It is understood that the satellite terminal 2 should include any component thereof a person skilled in the art can envision for the satellite terminal 2 to be successfully assembled for uses. Because the container 100 has a limited space therein, some of the satellite terminal components 2 can be disassembled when stored in the compartments, and assembled when unloaded from the compartments for uses. The disassembled parts can be secured by one or more devices without damaging each other. A relatively heavy part of the satellite terminal 2 is received in a lower part of the compartments 1 to lower the center of gravity for stability. This is especially important when the container 100 is loaded or accommodated in a carrier such as aircraft, watercraft, land-based vehicle. During the process of loading or accommodating, the center of gravity should be lowered to prevent the container 100 from falling or rolling. The satellite terminal components 2 can be arranged in the container 100 to lower the center of gravity. Further, the compartments 1 inside the container 100 can be designed or engineered accordingly.

Furthermore, a variety of devices are placed and configured to receive a corresponding portion of satellite parts 2, thereby preventing satellite parts 2 from being moved or damaged. The devices comprise a strap 7 that is configured to be tightly placed on a portion of the parts. The strap 7 can be easily loosened or tightened by users or operators. However, once tightened, the strap 7 is adapted to avoid being being loosened by itself from movement of the container and/or weight of the equipment. More than one strap 7 can be used for particularly heavy or large satellite terminal components 2. The other end of the strap 7 can be connected to frames or part of compartments 1. Alternatively, one or more than one metal supports that is attached to a portion of the compartments 1 can be used for connecting the strap 7. The devices further comprise a metal piece 8 that is installed vertically, horizontally, or both across a side of the compartments 1. The metal piece 8 additionally prevents satellite parts 2 from falling outside the compartments 1. The devices further comprise a rail or slot 9 that slidably receives a portion of the parts 2. The parts 2 can be adapted to fully slide to an end of the rail or slot 9 and tightly secured. In some embodiments, the rail or slot 9 is connected or attached to a top inner portion or surface of the container 100 to utilize an upper space therein, otherwise wasted.

Figure 2A:
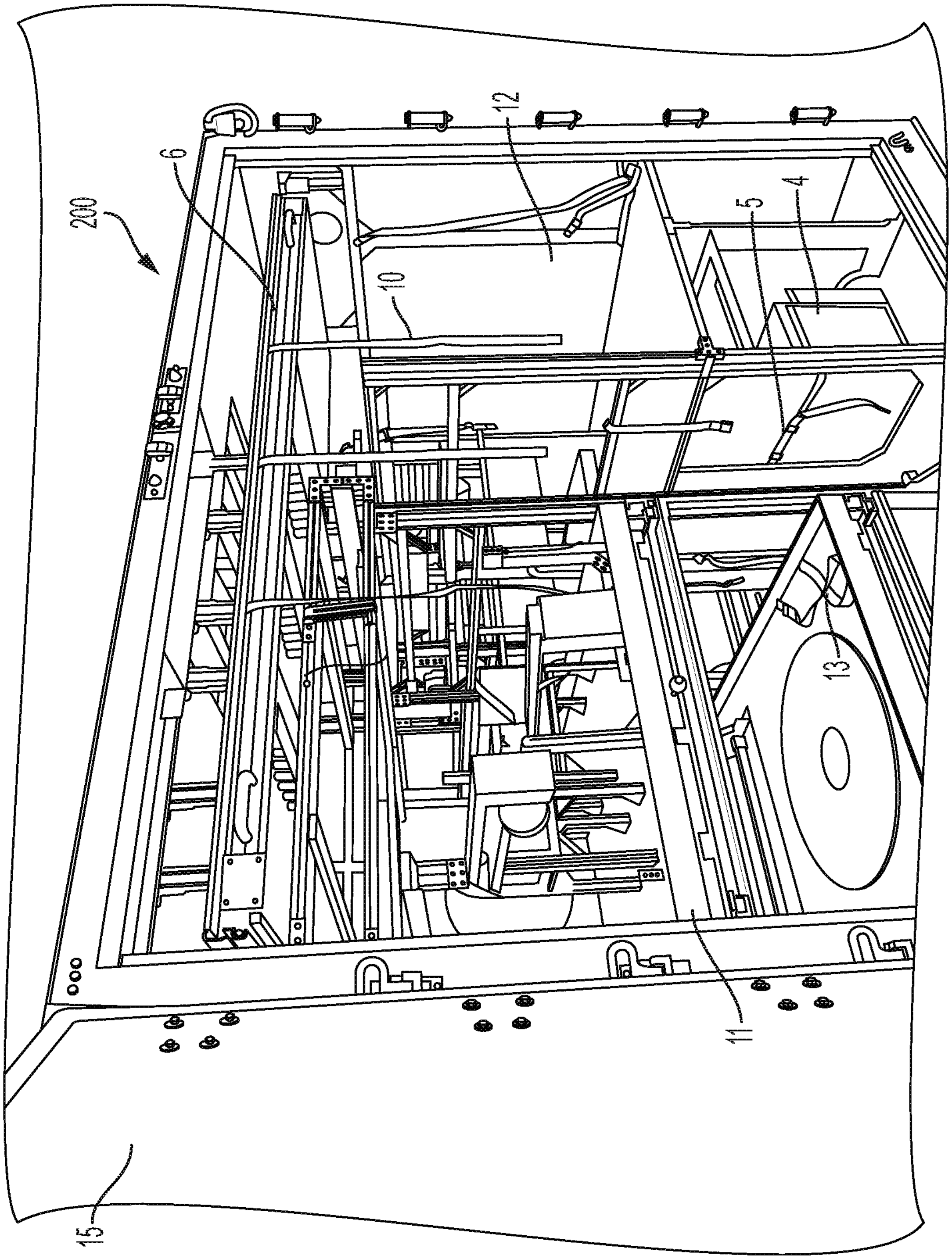
FIG. 2A is a perspective view of another embodiment of the container for shipping a satellite terminal with a rack embedded therein.
Figure 2B:
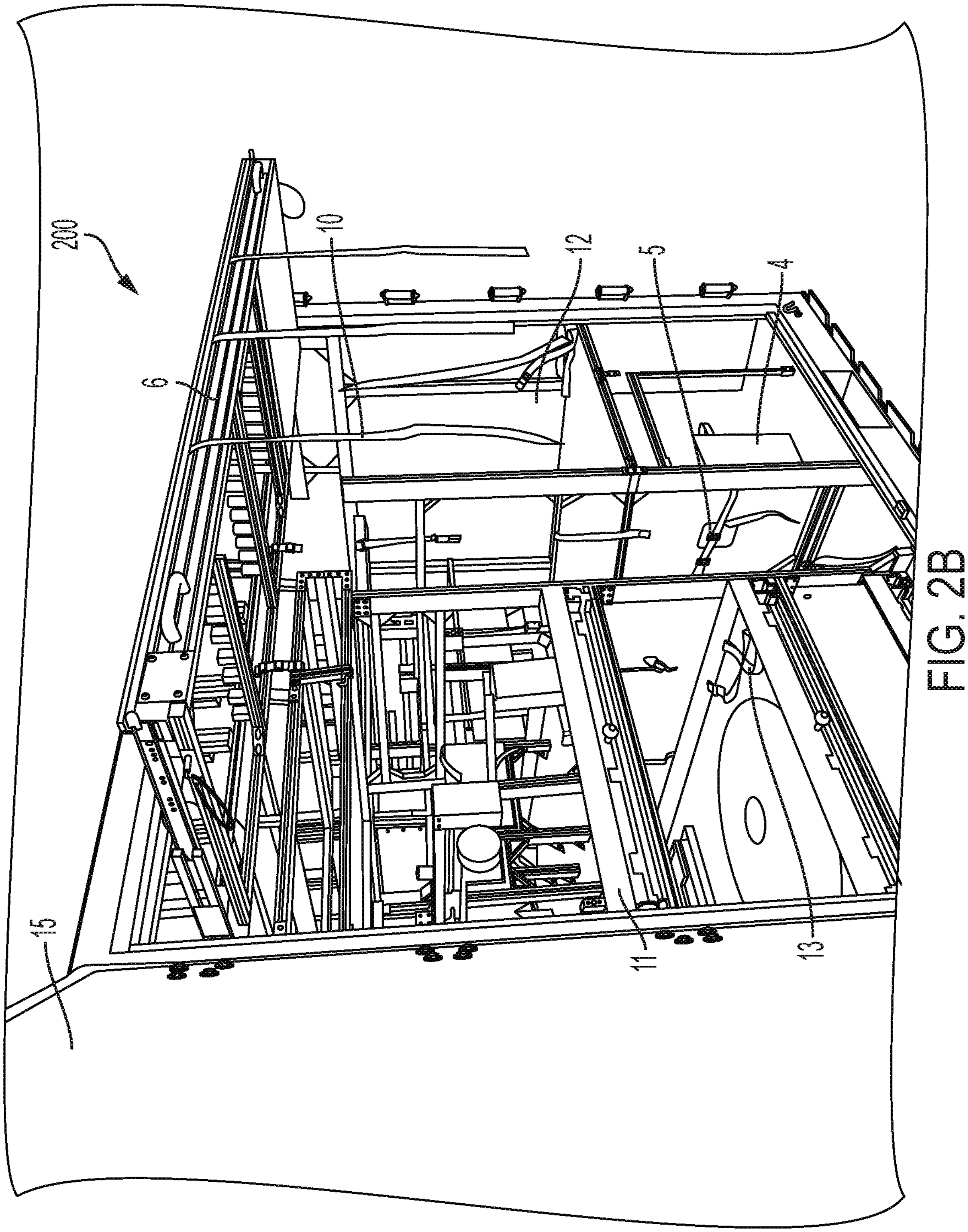
FIG. 2B is a perspective view of another embodiment of the container for shipping a satellite terminal with a rack parallelly slid out therefrom.
Figure 2C:
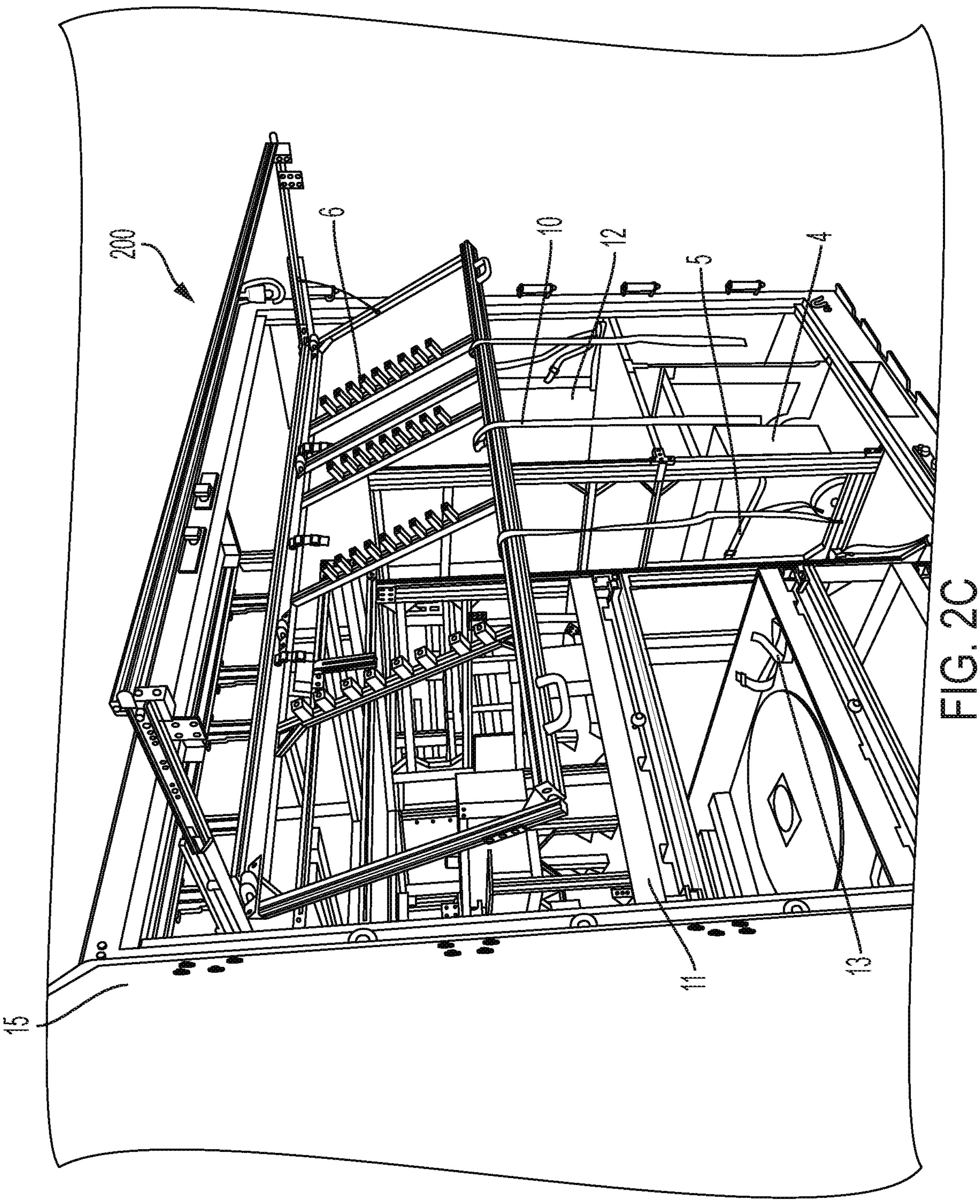
FIG. 2C is a perspective view of another embodiment of the container for shipping a satellite terminal with a rack hinged for loading.

With reference now to FIG. 2A, a perspective view of another embodiment of the container 200 for shipping a satellite terminal is shown adapted to have a rack 6 embedded therein. FIG. 2B is a perspective view of another embodiment of the container 200 for shipping a satellite terminal with a rack 6 parallelly slid out therefrom. FIG. 2C is a perspective view of another embodiment of the container 200 for shipping a satellite terminal with a rack 6 hinged for loading. In FIGS. 2A and 2B, the rack 6 can move in and out (e.g., slide into and out) of the container. When the rack 6 is in the container or in the first position (FIG. 2A), the rack 6 can be locked to prevent it from moving. The rack 6 can be unlocked and pulled out from the container 200 to the second position (FIG. 2A). In either the first or second position, the rack 6 is parallel or generally parallel to the bottom surface of the container 200 or the surface upon which the container 200 is placed (e.g., ground surface). The rack 6 is located at the top or near the top of the container 200. The rack 6 may be the topmost structure for storing terminal elements. The rack 6 is located at a position above some or all the compartments in the container 200. The height of the rack 6 (referring to the distance between the ground surface or the bottom surface of the container 200 and the rack 6) is approximately 6 feet. The height of the rack 6 can also be 5 feet or higher. Other heights are also contemplated as long as the height can provide sufficient volume (the volume below the rack 6) for other compartments and allow the rack 6 to be opened and closed without interference, or to be fully opened without interference.

The rack 6 includes a first frame and a second frame and can be opened and closed in the second position. FIG. 2B shows the closed rack 6 pulled to the second position. The first frame and the second frame are parallel in the second position. The rack 6 can be opened by moving (e.g., pulling) the second frame (bottom frame) downward or in a direction toward the container 200. FIG. 2C shows the rack 6 fully opened in the second position. The bottom frame can move or rotate between a closed position (FIG. 2B) and an open position (FIG. 2C). The rack 16 is opened by moving the bottom frame to the open position and closed by moving the bottom frame to the closed position. In the open position, the bottom frame is slanted with respect to the top frame (first frame) and allows terminal elements to be placed on the bottom frame. In the closed position, the bottom frame is parallel to the top frame. The rack 6 has a height that allows the bottom frame to move to the open position or be fully opened without interference such as touching the ground surface before reaching the open position because the height is too low.

The bottom frame includes fixtures such as protrusions that are configured to receive terminal elements (e.g., the width between two adjacent protrusions are dimensioned to fit a width of the terminal element and the height of the protrusions are long enough to secure or stabilize the terminal element but short enough to have a low profile). The bottom frame may include rows of fixtures configured to receive the front, middle, and rear portion of the terminal element. For example, the bottom frame may include a first row of fixtures configured to receive the front portion of the terminal element, a second row of fixtures configured to receive a middle portion of the terminal element, a third row of fixtures configured to receive another middle portion of the terminal element, and a fourth row of fixtures configured to receive the rear portion of the terminal element. The fixtures may be configured to receive terminal elements in the horizontal position. In other words, when a terminal element is inserted into the fixtures, the terminal element lies horizontally in the bottom frame. In some embodiments, adjustable protrusions can be used so that the width between adjacent protrusions and the height of the protrusions can be changed to fit the corresponding terminal element. Other arrangements of the fixtures or adjustable protrusions are also contemplated. In other arrangements, the fixtures or adjustable protrusions can receive the terminal element in the vertical direction or other directions (e.g., diagonally). The bottom frame with the fixtures can store multiple terminal elements.

After all the terminal elements are removed from or placed on the bottom rack, the bottom rack can be moved or rotated to close the rack 6. The bottom rack moves in a direction toward the top frame to close the rack 6. The bottom rack can be moved by pushing or lifting the bottom rack toward the top frame until the bottom frame engages or locks with the top frame (e.g., FIG. 2B). The closed rack 6 is then pushed into the container 200.

The rack 6 in the second position (FIG. 2B) has the bottom frame locked to the top frame and the rack 6 can be opened by unlocking the bottom frame. When the rack 6 is closed, the bottom frame is locked to the top frame again. The top frame stays fixed or stationary when the bottom frame opens and closes. When the rack 6 is closed (FIG. 2B), the rack 6 has a depth or thickness approximately 6-8 inches. When the rack 6 is opened, the rack 6 has a span approximately 2-4 feet.

The container 200 comprises one or more compartments 12 that are configured to partition an internal space of the container 200 and securely receive and fasten one or more parts of the satellite terminal. The container comprises an outermost door 15 that has access to the compartments 12. The door 15 is preferably hinged. The door 15 of the container 200 is currently open in FIG. 2. Some of the compartments 12 are in the form of a case 4 capable of holding the parts. The case 4 can provide additional protection for satellite terminal components that is sensitive to damage such as scratch. The case 4 can be secured to frames or compartments 12 by a latch, a wire, or a cable 5. The dimension of compartments 12 for storing case(s) 4 can be determined by the dimension of case 4. The rack 6 that is drawable, hingable, or both such that the parts can be easily received. The parts loaded onto the rack 6 can be further secured by a strap 10 to the rack. Container 200 further comprise a metal piece 11 that is installed vertically, horizontally, or both across a side of the compartments 12. The metal piece 11 additionally prevents satellite parts from falling outside the compartments 12. The container 200 further comprise a strap 13 that is configured to be tightly placed on a portion of the parts. The strap 13 can be easily loosened or tightened by users or operators. However, once tightened, the strap 7 would not be loosened by itself. More than one strap 13 can be used for particularly heavy satellite terminal components. The other end of strap 13 can be connected to frames or part of compartments 12. Alternatively, one or more than one metal supports that is attached to a portion of the compartments can be used for connecting the strap 13.

Figure 3:
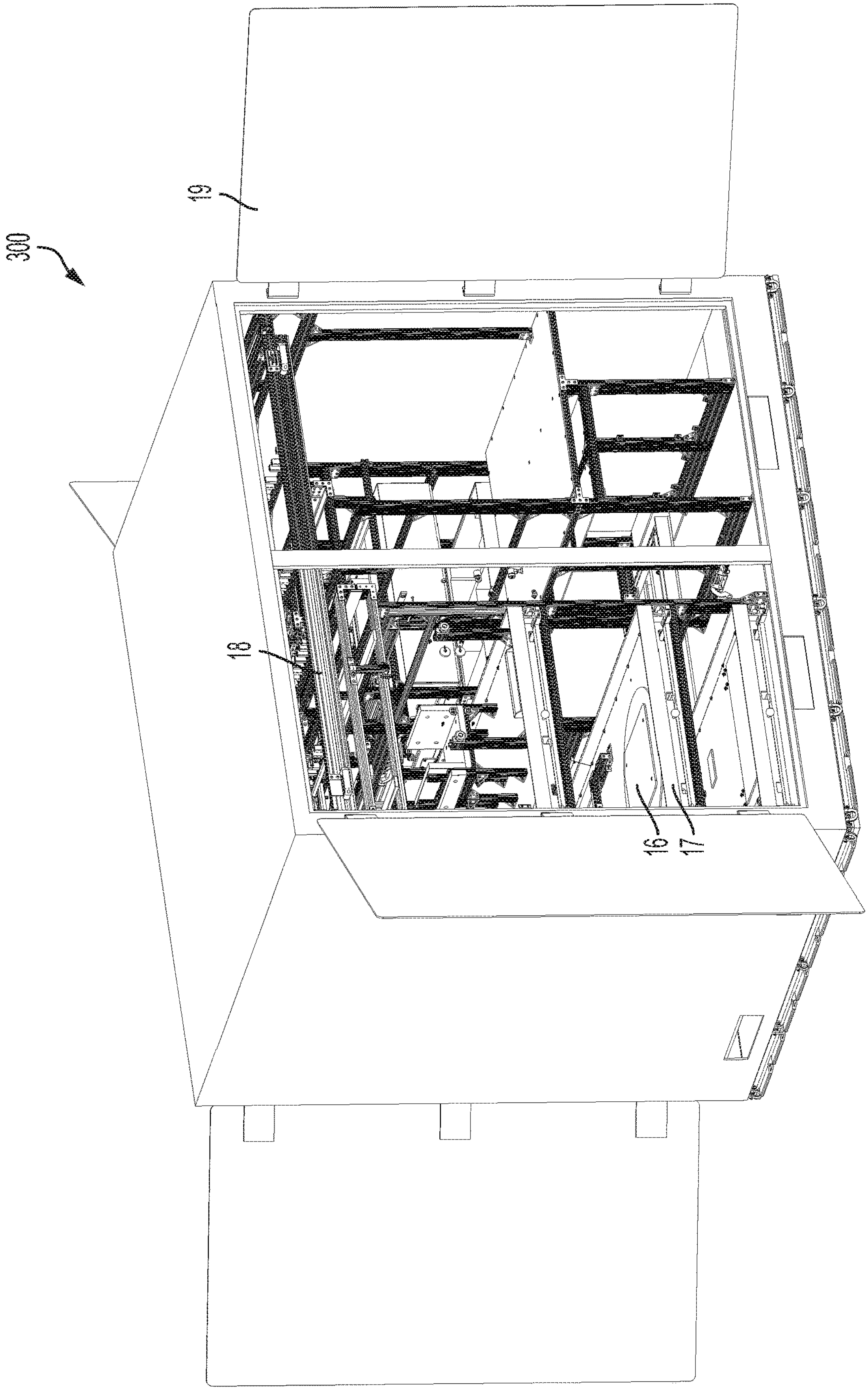
FIG. 3 is a front perspective view of another embodiment of the container for shipping a satellite terminal.

With reference now to FIG. 3, the container 300 comprises one or more compartments 16 that are configured to partition an internal space of the container 300 and securely receive and fasten one or more parts of the satellite terminal. The container 300 comprises an outermost door 19 that has access to the compartments 16. The door 19 is preferably hinged. The door 19 of the container 300 is currently open in FIG. 3. The container 300 further comprises one or more devices that are configured to secure the parts and prevent them from being moved or damaged. The devices comprise a metal piece 17 that is installed vertically, horizontally, or both across a side of the compartments 16. The metal piece 17 additionally prevents satellite parts from falling outside the compartments. The devices further comprise a rail or slot 18 that slidably receives a portion of the parts. The parts can fully slide to an end of the rail or slot 18 and tightly secured.

Figure 4:
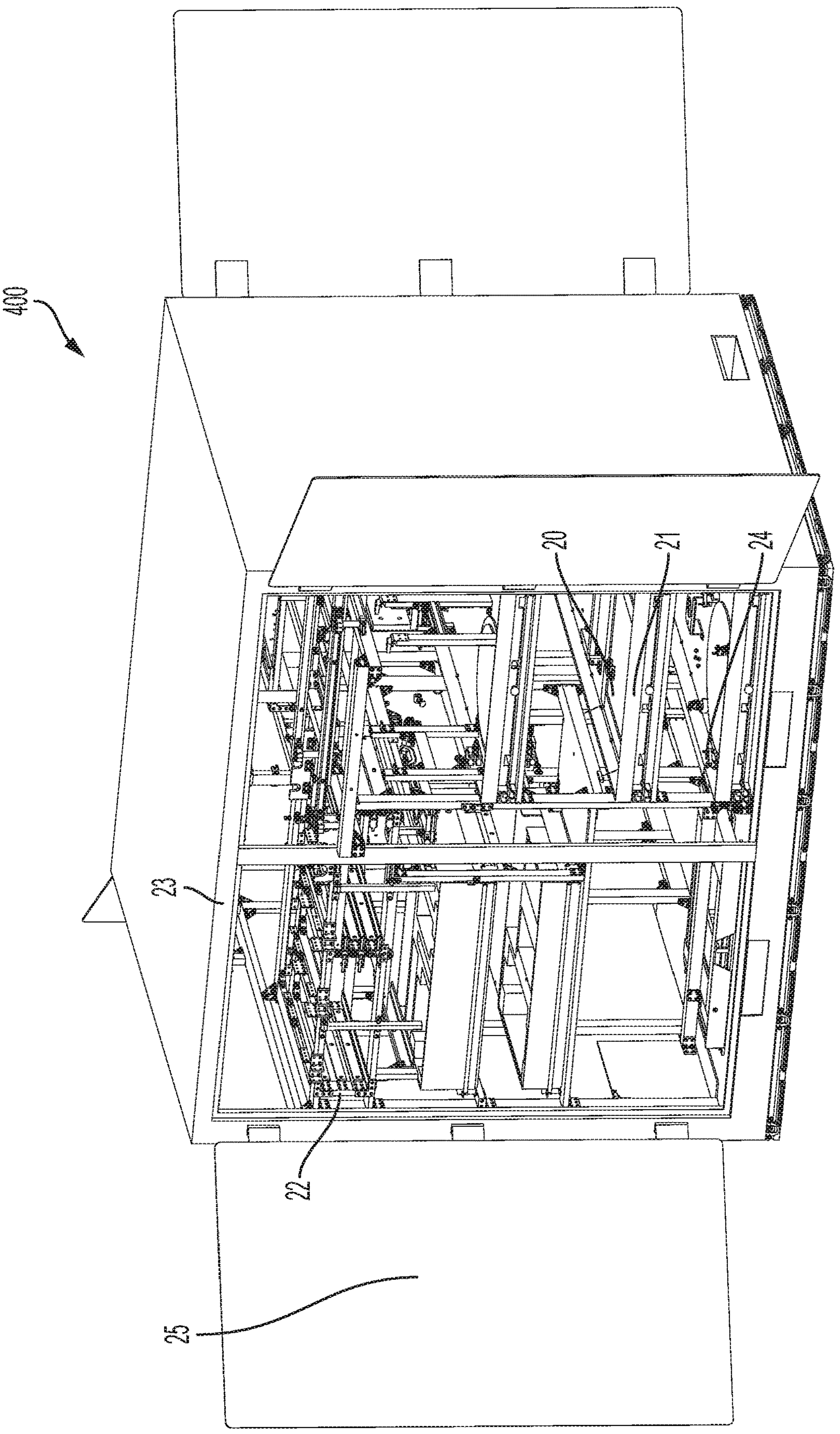
FIG. 4 is a rear perspective view of the container shown in FIG. 3.

With reference now to FIG. 4, the container 400 comprises one or more compartments 20 that are configured to partition an internal space of the container 400 and securely receive one or more parts of the satellite terminal. It is evident from the figures that in some instances an empty container is displayed and in others, the container holding the components of satellite terminal for transportation are illustratively displayed. The container 400 comprises an outermost door 25 that has access to the compartments 20. The door 25 is preferably hinged. The door 25 of the container 400 is currently open in FIG. 4. The container 400 further comprises one or more devices that are configured to secure the parts and prevent them from being moved or damaged. The devices comprise a metal piece 21 that is installed vertically, horizontally, or both across a side of the compartments 20. The metal piece 21 additionally prevents satellite parts from falling outside the compartments. The devices further comprise a rail or slot 22, 23 that slidably receives a portion of the parts. The parts can be fully slid to an end of the rail or slot 22, 23 and tightly secured. The devices further comprise a holder 24 that receives a portion of the parts corresponding to a shape of the holder 24. In an embodiment, the holder 24 is U-shaped or C-shaped so that it can easily secure the parts.

Figure 5A:
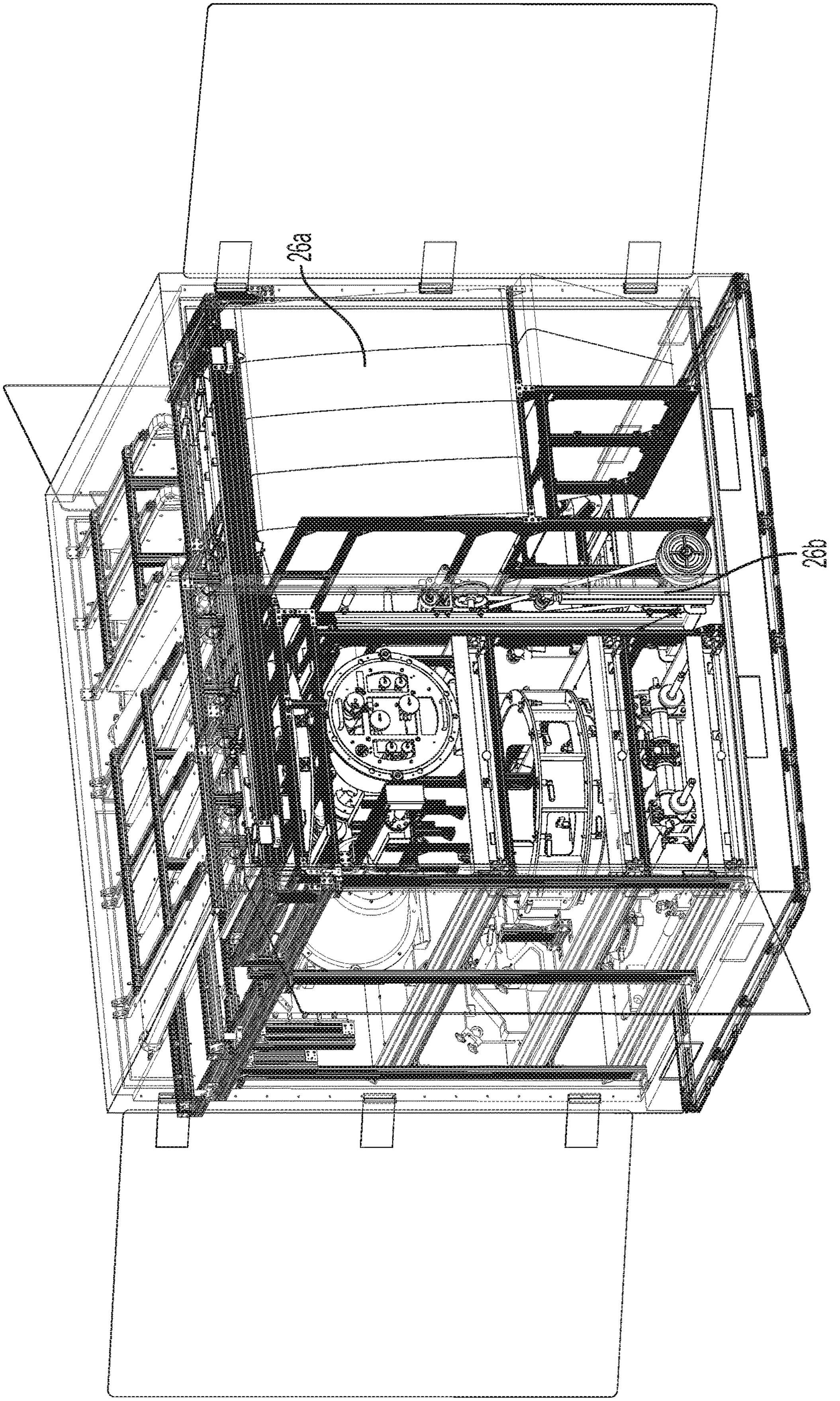
FIG. 5A is a front perspective view of the container shown in FIG. 3 that is filled with terminal elements.
Figure 5B:
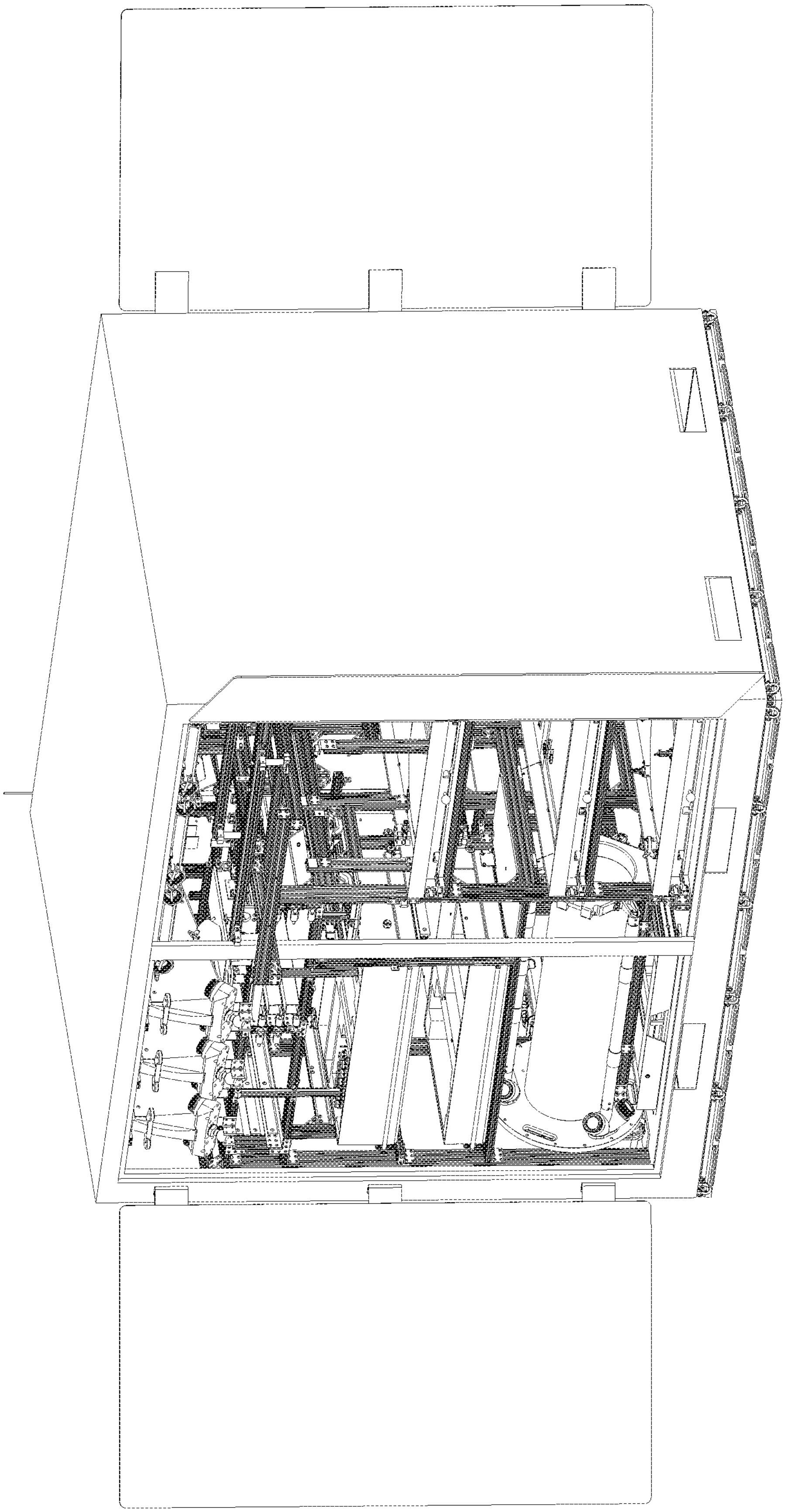
FIG. 5B is a rear perspective view of the container shown in FIG. 5A.

FIG. 5A is a front perspective view of the container shown in FIG. 3 that is filled with terminal elements. FIG. 5B is a rear perspective view of the container shown in FIG. 5A. The container includes a compartment **26*a*** dimensioned for storing individual reflector pieces of a satellite antenna. A satellite antenna that is substantial in size includes a large parabolic reflector that is assembled from a plurality of smaller reflector pieces. The compartment is dimensioned to store such disassembled pieces or unassembled parabolic reflector, rather than an entire assembled parabolic reflector. The other compartments are dimensioned to store disassembled pedestal components or unassembled pedestal. Each reflector piece can be placed in a bag and the bagged pieces can be stored in the compartment. The compartment can store all the reflector pieces of the satellite antenna (or all the bagged pieces). The compartment may include hooks or mechanisms to hang or otherwise engage the bag of the reflector piece. The hook or other mechanism may suspend the bagged piece in the air (the reflector piece does not touch the bottom surface or any other surfaces of the compartment) to reduce damage to the reflector piece while the container is being transported.

The container also includes a compartment **26*b*** dimensioned for storing a hand truck or other equipment for moving terminal elements between places. The compartment is preferably rectangular given the shape and dimensions of the hand truck. The compartment may have a roughened bottom surface with additional friction to engage the wheels of the hand truck so that the hand truck is less likely to move in the compartment while the container is being transported. The compartment may have mechanisms to lock the hand truck in the compartment. The hand truck can be used to carry terminal elements taken out from the container to other locations. The hand truck can also be used to carry terminal elements disassembled on the field back to the container.

The container includes one or more compartments having one or more grooves configured to receive a compartment engaging structure of a terminal element. The compartment engaging structure may have a reciprocal structure or a structure to fit in the groove. The groove allows the terminal element to move in and out the compartment via the compartment engaging structure. To put a terminal element in this compartment, the compartment engaging structure is first aligned with the groove and the terminal element is then pushed into the compartment. The groove supports the terminal element and the terminal element is stored the compartment in this position. To remove a terminal element in this compartment, the terminal element is pulled out from the compartment until the entire compartment engaging structure slid out from the groove. One end of the compartment (e.g., the end toward which the terminal element is pushed to store the terminal element or back end, or the end toward the door or the front end) may be configured to secure or stabilize the terminal element. For example, that end may include two parallel plates, protrusions, brackets, or the like adapted to receive one end of the terminal element.

The plates, protrusions, brackets, or the like may define a distance or space that corresponds to the thickness of that end of the terminal element (e.g., fits precisely). The distance or space may also be larger or slightly larger than the thickness of the terminal element's end as long as it can make the wobbling of the terminal element negligible.

Figure 6:
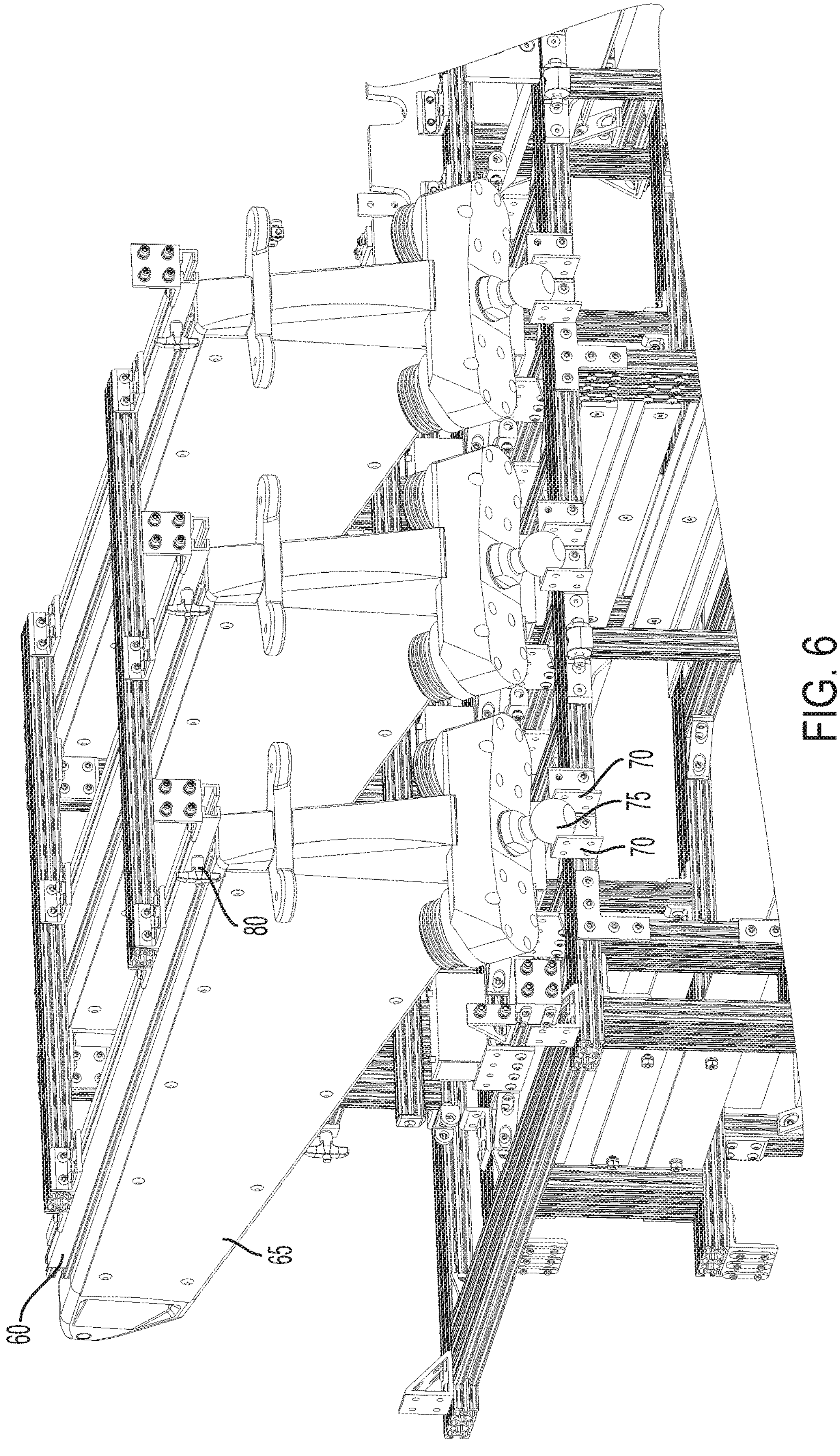
FIG. 6 shows a groove and a pair of brackets in a compartment configured to receive a compartment engaging structure of a terminal element and stabilize the terminal element, respectively.
Figure 7:
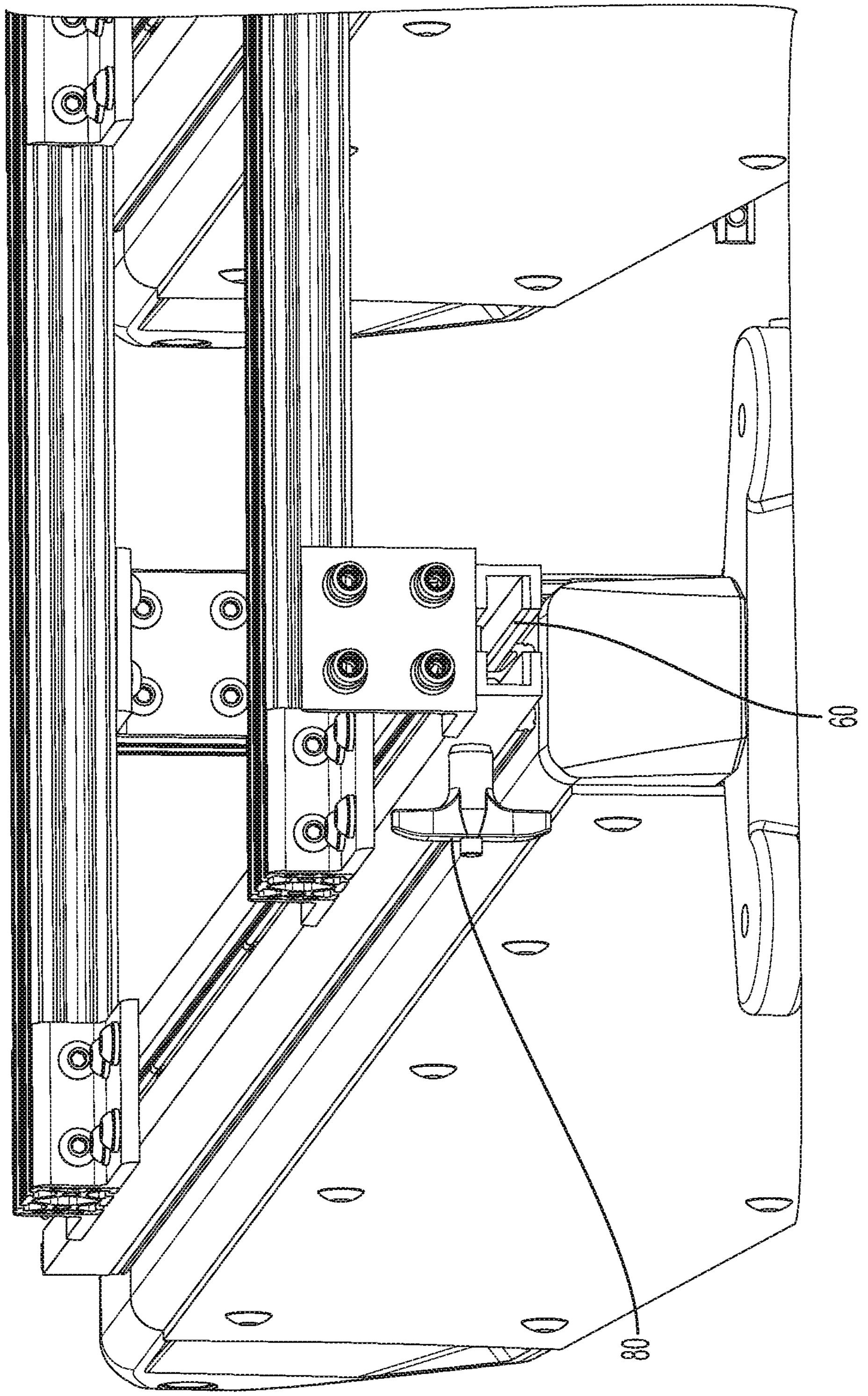
FIG. 7 is a closer view of the groove and pin shown in FIG. 6.
Figure 8:
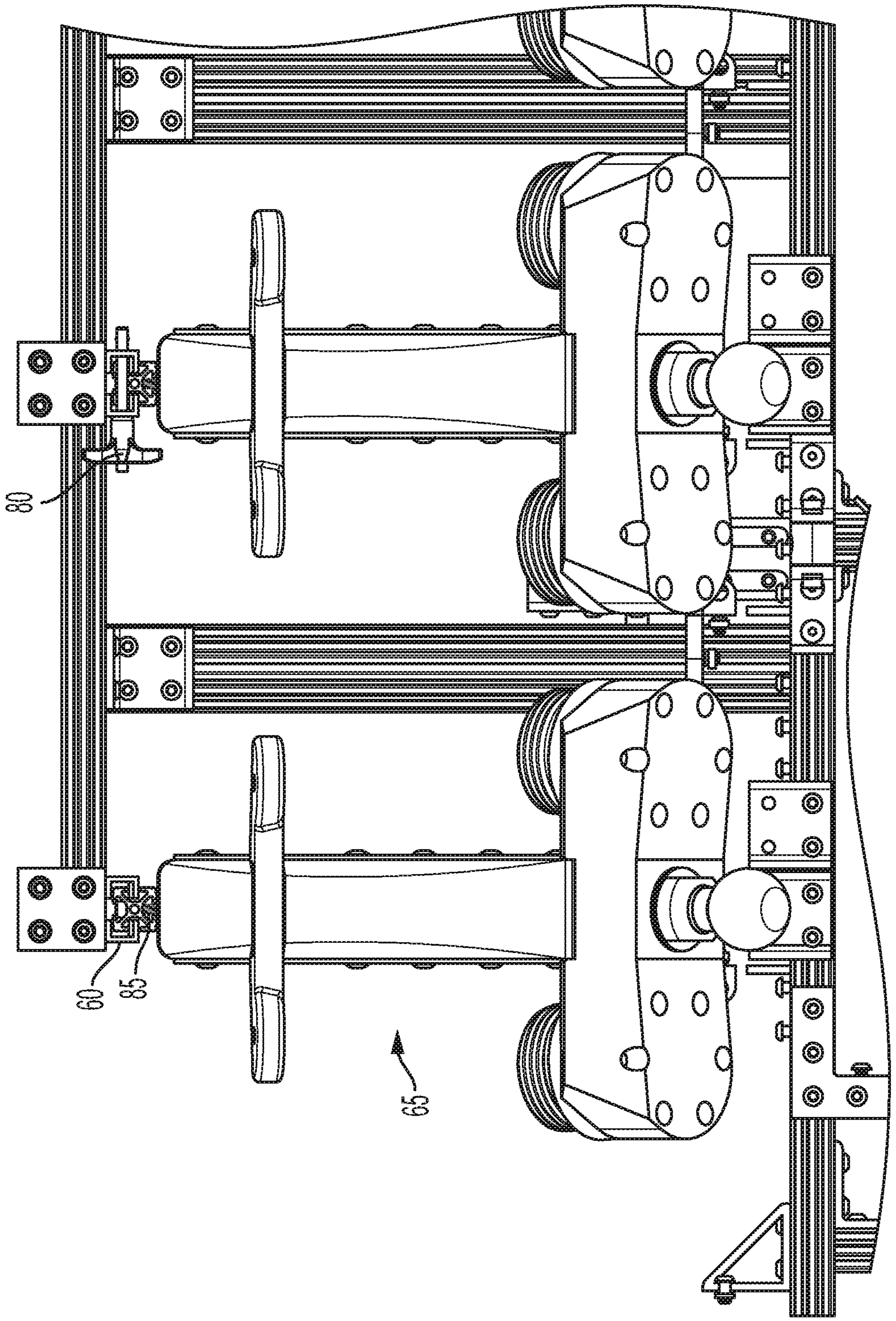
FIG. 8 is a front or cross-sectional view of the compartment showing the groove, the compartment engaging structure of the terminal element, and the pin.

FIG. 6 shows an illustrative groove 60 in a compartment configured to receive a compartment engaging structure of a terminal element 65 (e.g., bottom spar 65) and a pair of brackets 70 in the compartment configured to stabilize the terminal element 65. The brackets 70 are located at or near the front end of the compartment (the end near the door). After the terminal element 65 is fully slid into the compartment, the mechanism or protrusion 75 of the terminal element 65 configured to engage with another terminal element stored in the container sits in the brackets 70 (between the pair of brackets 70). The groove 60 is provided with a pin or quick-release pin 80 that can be removed from the groove 60 to load the terminal element 65 and be re-inserted into the groove 60 to prevent the terminal element 65 from sliding out. FIG. 7 is a closer view of the groove 60 and the pin 80 inserted into the groove. FIG. 8 is a front or cross-sectional view of the compartment showing the groove 60, the compartment engaging structure 8S of the terminal element 65, and the pin 80 inserted into the groove. Part of the compartment engaging structure 85 is in the groove 60 and the terminal element 65 is "hung" in the compartment by the groove 60.

Figure 9:
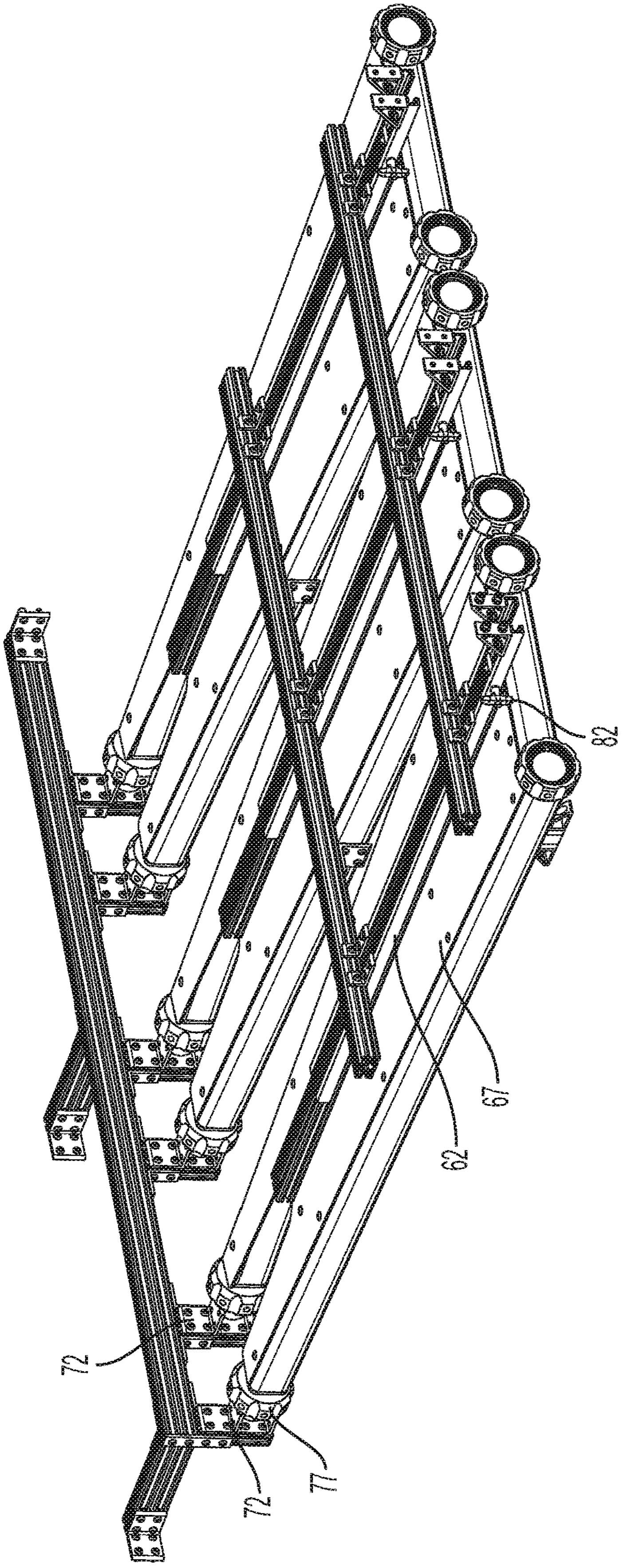
FIG. 9 shows a groove and a mechanism in another compartment configured to receive a compartment engaging structure of another terminal element and engage a mechanism of the other terminal element.
Figure 10:
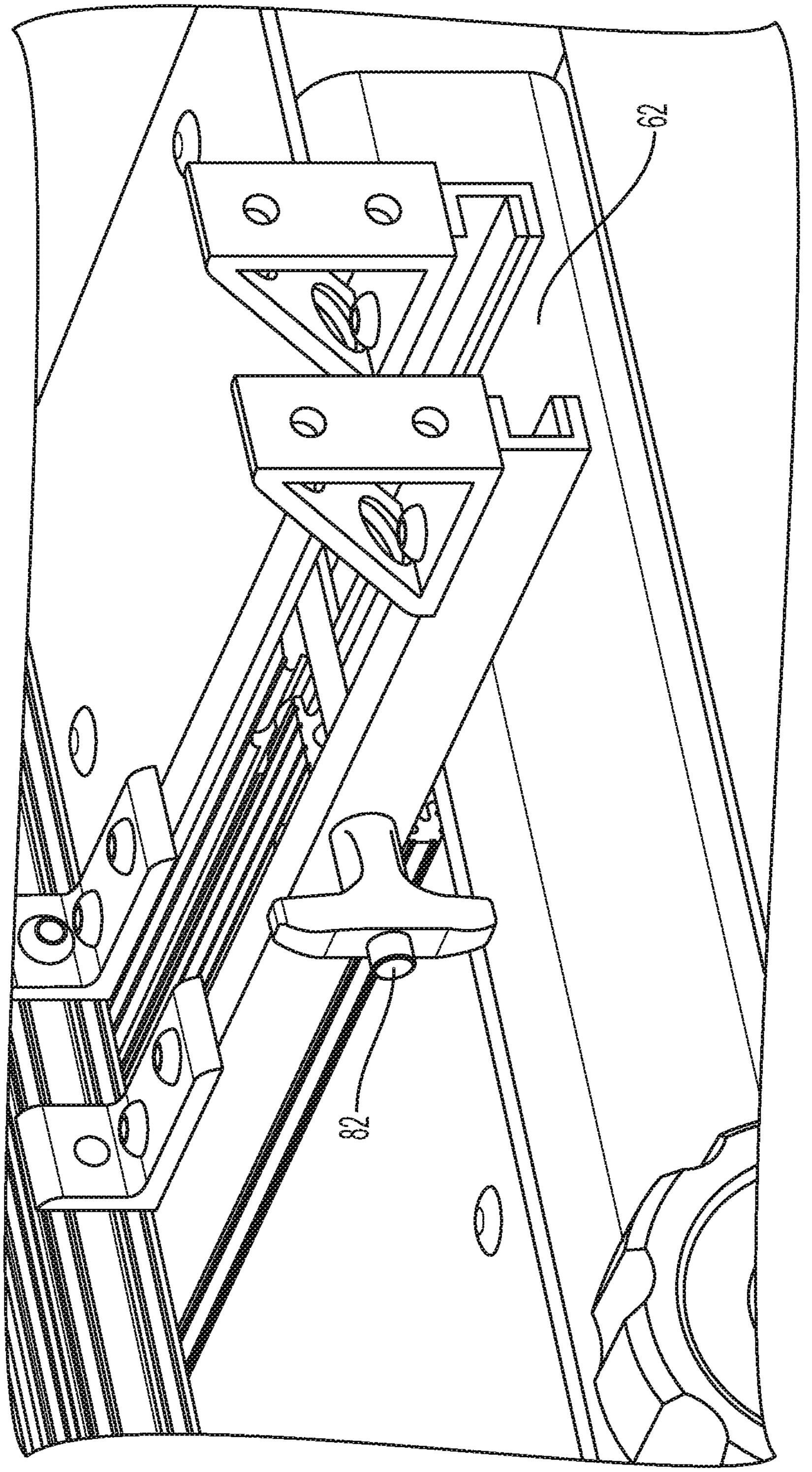
FIG. 10 is a closer view of the groove and pin shown in FIG. 9.
Figure 11:
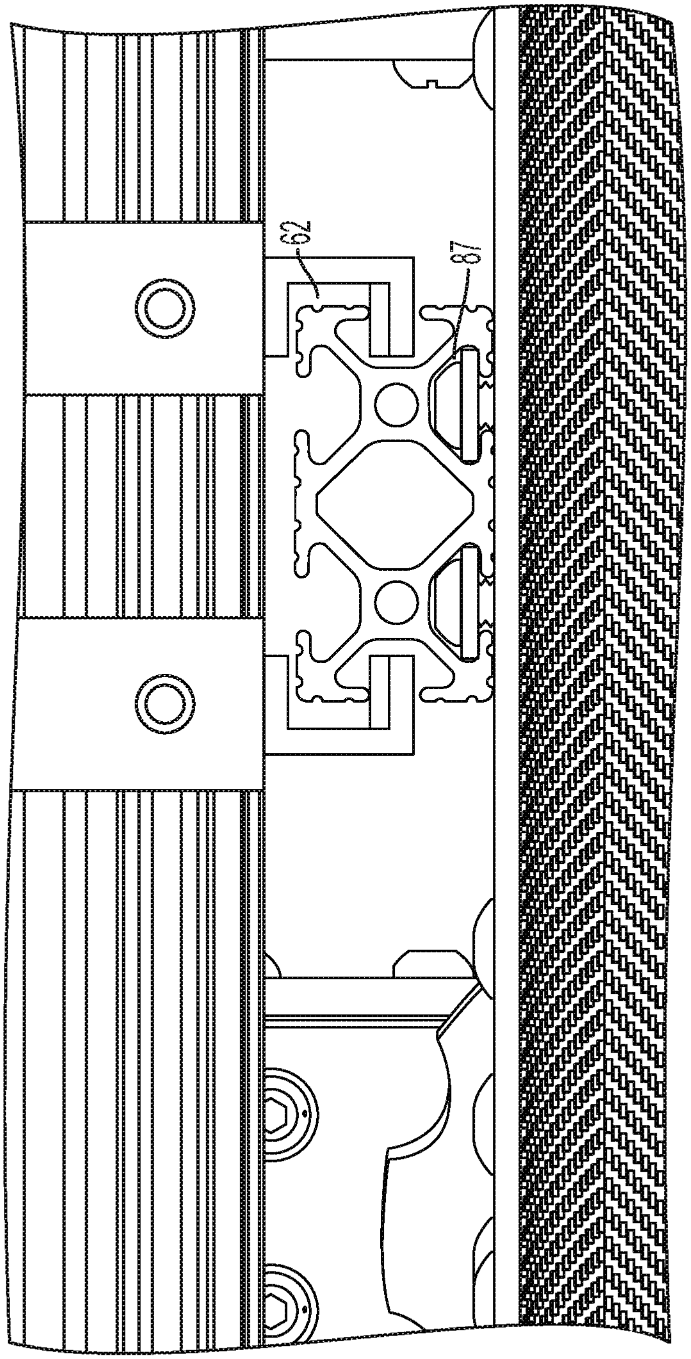
FIG. 11 is a front or cross-sectional view of the other compartment showing the groove and the compartment engaging structure of the terminal element depicted in FIG. 9.

FIG. 9 shows an illustrative groove 62 in another compartment configured to receive a compartment engaging structure of another terminal element 67 (e.g., top spar 67). The compartment also includes a mechanism 72, such as one or more protrusions or brackets, configured to engage or be inserted into the mechanism of the terminal element 67 that is configured to engage with another terminal element stored in the container. The mechanism 72 is located at or near the back end of the compartment. The groove 62 is provided with a pin or quick-release pin 82 that can be removed from the groove 62 to load the terminal element 67 and be re-inserted into the groove 62 to prevent the terminal element 67 from sliding out. FIG. 10 is a closer view of the groove 62 and the pin 82 inserted into the groove. FIG. 11 is a front or cross-sectional view of the compartment showing the groove 62 and the compartment engaging structure 87 of the terminal element 67. Part of the compartment engaging structure 87 is in the groove 62 and the terminal element 67 is "hung" in the compartment by the groove 62.

The compartment engaging structure 85, 87 may be the structure that directly engages of slides into the groove 60, 62. In some embodiments, the compartment engaging structure 85, 87 may be configured to receive an intermediate structure that is configured to engage or slide into the groove 60, 62.

Figure 12:
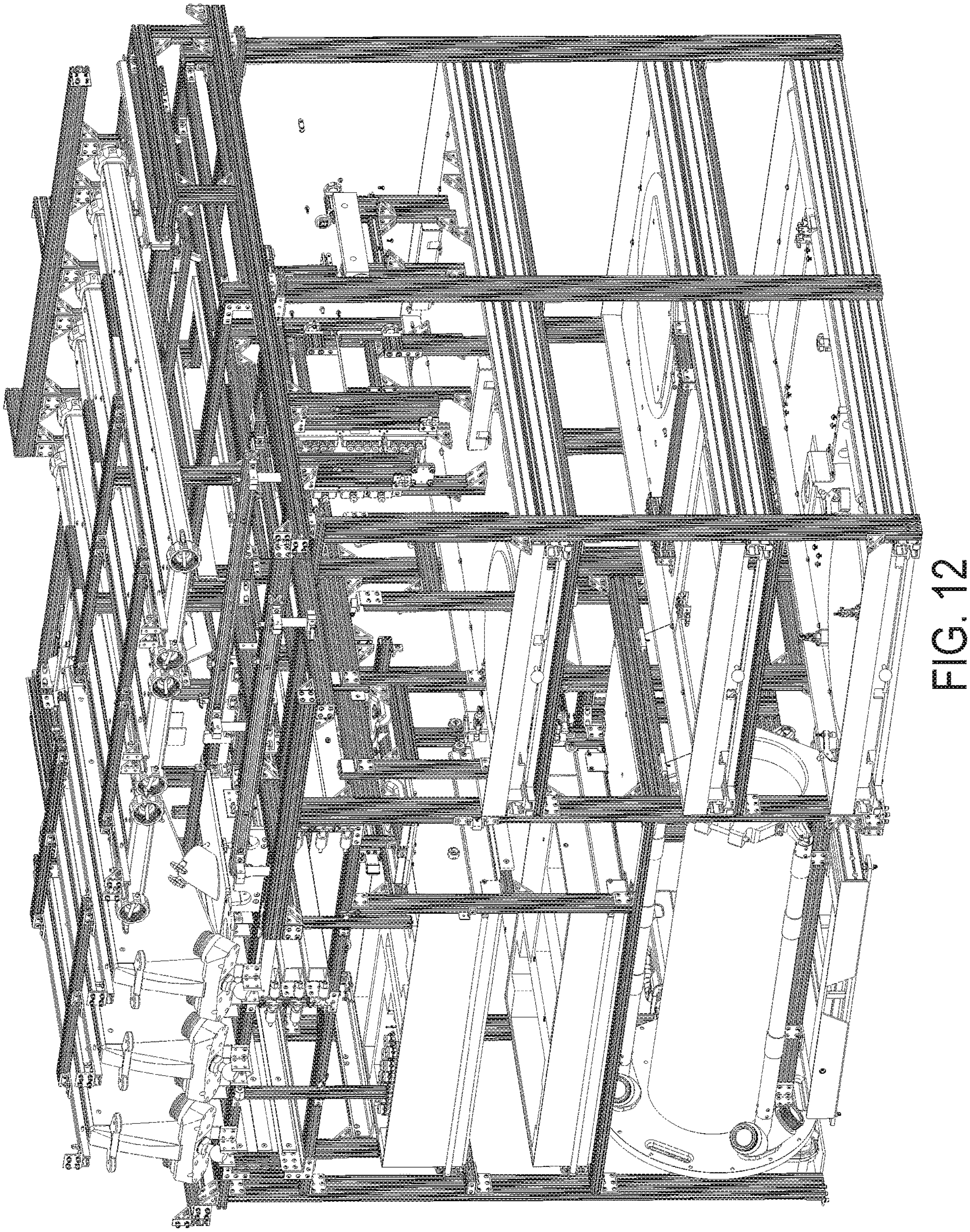
FIG. 12 is a transparent view of the container showing some terminal elements stored in the container.
Figure 13:
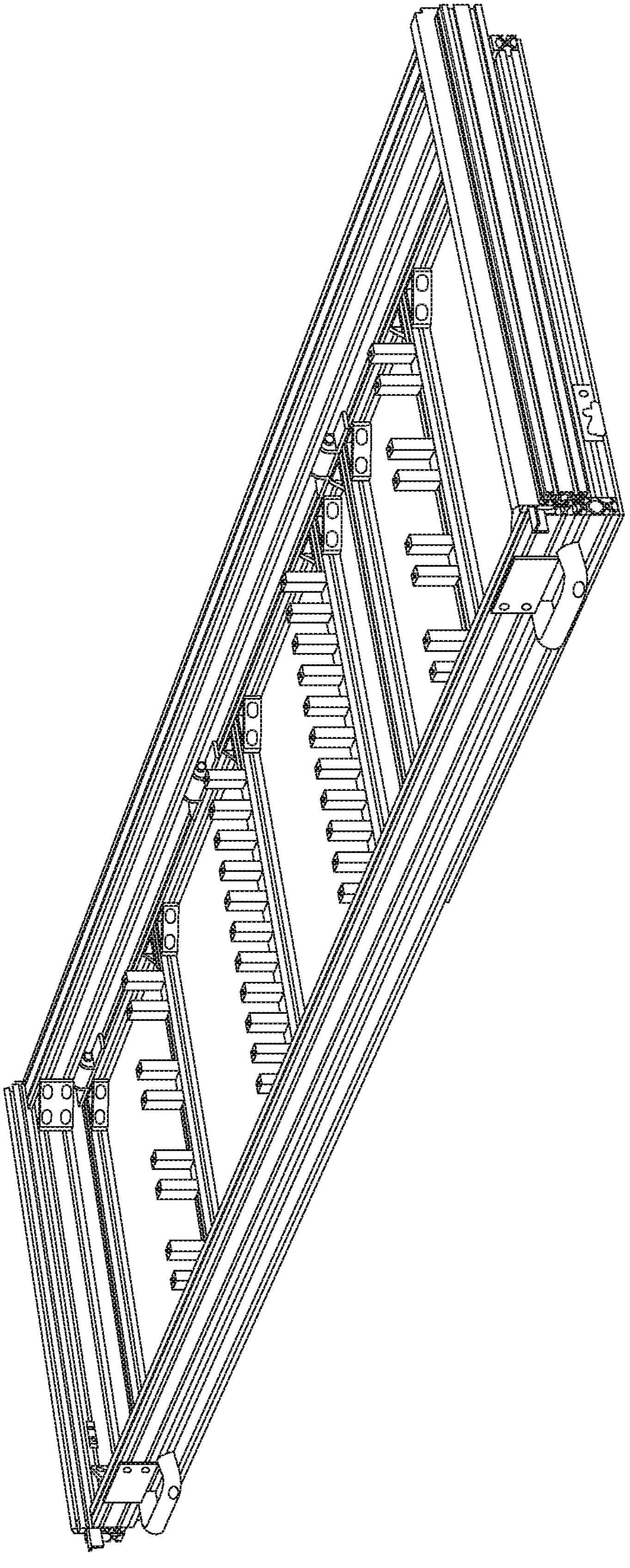
FIGS. 13-15 are additional views of the rack shown in FIGS. 2A-2B.
Figure 14:
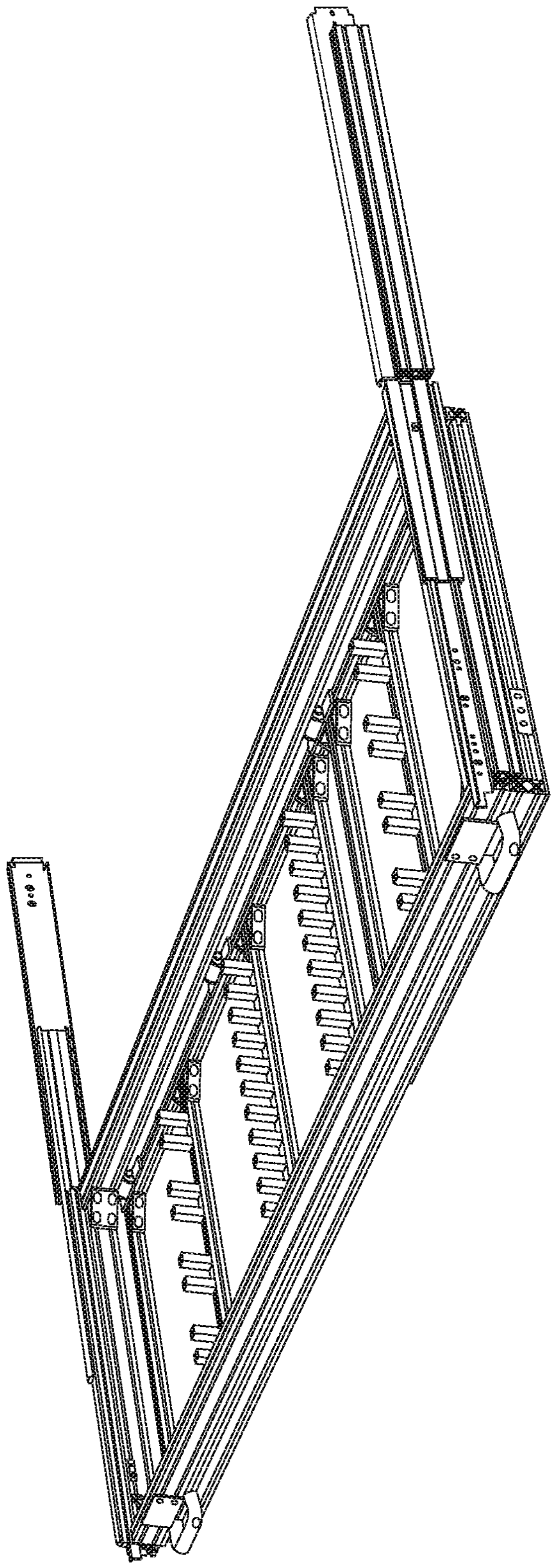
Figure 15:
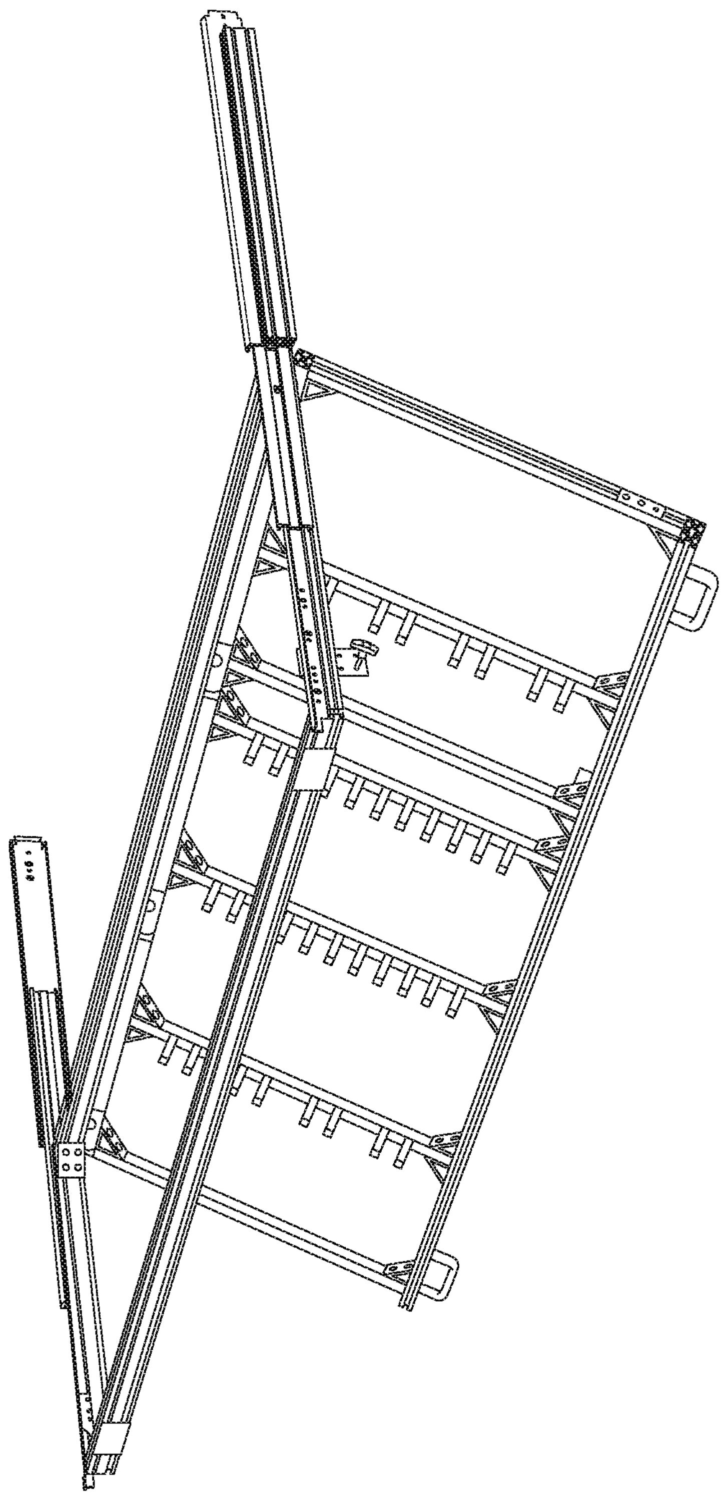

FIG. 12 is a transparent view of the container showing the terminal elements 65, 67 stored in the container and the locations of the compartments storing those elements with respect to other compartments in the container. FIGS. 13-15 are additional views of the rack 6 shown in FIGS. 2A-2B.

In some embodiments, the container may be an Internal Stability Unit (ISU) container or an Internal Airlift/Helicopter Slingable Unit (ISU) container. The container may have one of more doors, and compartments shelves, trays, restraints, or a combination thereof for storing, securing, and protecting pedestal components and reflector pieces. The terminal includes only a small number of pedestal components and reflector pieces such that one container is sufficient to store all the parts. The container can be transported by a vehicle such as aircraft, watercraft, land-based vehicle. For example, a wire or rope can be used to connect or attach the container to the aircraft, and the container can be lifted up by the aircraft and transported to different locations. The container can be dropped from air up the heights specified by military requirements without damaging the container or the pedestal components and reflector pieces inside. The container can also be placed on the deck, flatbed, or other surface on the watercraft or land-based vehicle for delivery. For example, the container may be an ISU-90 container. The container is preferably a military grade container such as an ISU-90 container. In one embodiment, the container has a size approximately 108" W×88" L×90" H, weights approximately 1,700 lbs., has a payload capacity approximately 10,000 lbs., and can support a maximum gross weight approximately 11,700 lbs. Other dimensions, weights, payload capacity, maximum gross weight, and types of containers are also contemplated.

Reference to a particular physical dimension, range, or weight (such as weight or length) is understood to refer to that specific number and to a range at or about +25% of the number unless an approximation is specified for that dimension, range, or weight.

Unless defined otherwise, all technical and scientific terms used herein have same meaning as commonly understood by the person of ordinary skill in the art to which this invention belongs. Thus the scope of the embodiments of the present invention should be determined by the appended claims and their legal equivalents rather than by the Figures.

What is claimed is:

1. A portable container for shipping an unassembled satellite terminal comprising:
- one or more compartments that are configured to partition an internal space of the container and adapted to securely receive one or more parts of the unassembled satellite terminal;
- a rack that is drawable, hingable, or both such that one or more of the parts can be easily received;
- a strap that is tightly placed on a portion of the one or more parts;
- a metal piece that is installed vertically, horizontally, or both across a side of the compartments;
- a rail or slot that slidably receives a portion of the parts;
- a holder that receives a portion of one or more of the parts corresponding to a shape of the holder; and
- a door that gives access to the compartments,
- wherein the container, the compartments and the devices are of high-strength materials that bear a weight of the parts and external shocks;
- wherein the container comprises the one or more parts of the unassembled satellite terminal which comprises reflector parts, beams, pedestal parts, brackets, a generator, a modem and an amplifier that are configured to securely be received in the one or more compartments; and
- wherein a relatively heavy portion of the satellite terminal is received in a lower part of the compartments for stability.

2. The portable container of claim 1, wherein some of the compartments are in the form of a bag that is capable of holding one or more of the parts.

3. The portable container of claim 2 further comprises a latch, a wire, or a cable that is vertically positioned to secure the bag.

4. The portable container of claim 1, wherein the door is hinged.

5. The portable container of claim 1, wherein the high-strength materials comprise carbon fiber, aluminum, or a combination thereof.

* * * * *